Oct. 27, 1953　　　　C. C. HERSKIND　　　　2,657,335
STABILIZED ARC SUPPRESSING SYSTEM FOR ELECTRONIC
DEVICES USING STATIC COMPONENTS
Filed July 25, 1952
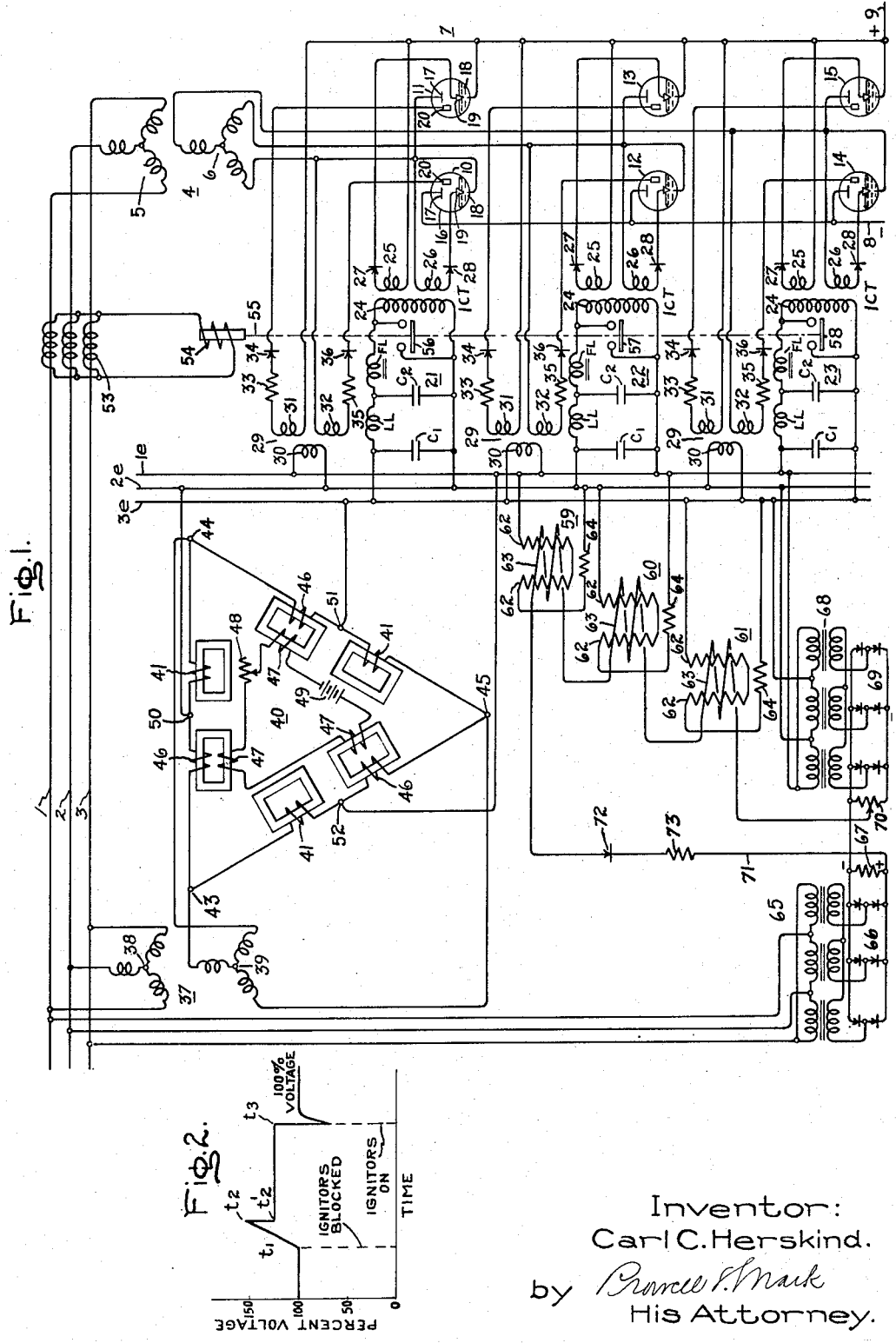
Inventor:
Carl C. Herskind.
by　*Browell F. Mack*
His Attorney.

Patented Oct. 27, 1953

2,657,335

UNITED STATES PATENT OFFICE 2,657,335

STABILIZED ARC SUPPRESSING SYSTEM FOR ELECTRONIC DEVICES USING STATIC COMPONENTS

Carl C. Herskind, Schenectady, N. Y., assignor to General Electric Company, a corporation of New York Application July 25, 1952, Serial No. 300,888

4 Claims. (Cl. 315—195)

1

This invention relates to stabilized arc suppressing systems for electronic devices and more particularly to an arrangement utilizing static components for maintaining properly balanced voltage and phase relationships in excitation circuits for electric valves of the ignitron type during the period when such circuits are blocked to prevent conduction under particular service and fault conditions. This invention is an improvement over the arrangement disclosed in Patent 2,550,577—Herskind et al., granted April 24, 1951, and assigned to the assignee of this invention.

Electric valves of the type wherein an anode, a mercury pool cathode, a control grid and an auxiliary anode are disposed within an enclosing envelope, utilize an ignitor element immersed in the mercury pool forming the cathode for establishing an ionized condition within the enclosure in response to the flow of electric current through the ignitor element and the mercury pool. If the circuit which supplies electric energy to the ignitor is short circuited, conduction through the valve is not started. In this way a cathode spot is prevented from becoming established and conduction through the tube during succeeding cycles is therefore automatically prevented.

The magnitude of current which flows through an electric valve of the ignitron type can be controlled by controlling the instant at which a cathode spot is established relative to the cathode-anode voltage as is well known. One arrangement whereby the phase angle of energization of the cathode is regulated relative to the cathode-anode voltage is disclosed in Patent 2,598,432—Price, granted May 27, 1952, and assigned to the assignee of this invention. This Price patent discloses a phase shift circuit which effectively changes the phase angle of the ignitor firing circuit thereby to regulate the magnitude of current through the associated cathode-anode circuit of the associated electric valve.

The application of a short circuit across the circuit means for energizing the ignitor interferes with the voltage and phase angle conditions of a phase shift circuit such as the arrangement disclosed in the above Price patent and which is utilized to energize the ignitor. Thus, when it is desired to remove the short circuit from across the circuit means energizing the ignitor, the associated ignitron is immediately rendered conductive but the magnitude of current which flows is considerably greater than normal due to the fact that the short circuiting of the circuit means energizing the ignitor advances the phase angle of the output terminals of the phase shift circuit.

This condition is met in accordance with the above-mentioned Herskind et al. patent by placing an impedance means as a simulated load across the phase shift circuit output terminals when the blocking short circuit is placed across

2 the ignitor firing circuit. In accordance with the teaching of the above Herskind et al. patent, contactors having moving parts are utilized to place the simulated load on the phase shift circuit when the ignitor firing circuit is blocked.

An object of this invention is to provide an improved arc suppressing arrangement for use in conjunction with electric valves of the ignitron type which arrangement is effective to restore the ignitrons to normal operation within a very short interval of time after the arc suppression period is terminated and wherein static components are utilized as distinguished from circuit elements having moving parts.

In accordance with the invention, impedance means is connected in series with a saturable reactor having a main winding and a control winding, the series circuit being connected across the circuit means for energizing the ignitor of an ignitron valve. In addition, means responsive to a condition which arises when the ignitor elements are de-energized are utilized to cause a current to flow through the control winding of the saturable reactor thereby to tend to saturate the reactor and reduce its impedance. In this way the total impedance across the circuit means which normally energizes the ignitor is substantially reduced and an increased current flows which tends to reduce the voltage and to maintain stable conditions in the circuit which energizes the ignitor.

The invention will be better understood with reference to the accompanying drawing in which Fig. 1 represents an ignitron rectifier arrangement embodying the invention, and in which Fig. 2 is a curve showing the effect of the invention as a stabilizing element on the ignitor voltage.

With reference to Fig. 1 an alternating current circuit comprising the conductors 1, 2 and 3 supplies energy to a transformer 4 having a primary winding 5 and a secondary winding 6. Connected to the secondary winding 6 is a full-wave rectifier generally designated by the numeral 7 which supplies direct current to the direct current circuit indicated by the numerals 8 and 9.

The rectifier 7 comprises six valves of the ignitron type designated by the numerals 10–15. The valves 10–15 are identical and each comprises an enclosing envelope 16 in which are disposed an anode 17, a mercury pool cathode 18 in which is immersed an ignitor element 19, an auxiliary or holding anode 20, as well as a control grid which is not shown in the drawing for purposes of simplicity. As is well known, a current supplied to ignitor 19 of each of the valves establishes a cathode spot on the mercury pool 18. This cathode spot is maintained due to the fact that the auxiliary anodes 20 are at positive potential relative to the associated cathodes and, hence, cause a current to flow therebetween. Once the cathode spot is established and maintained as already explained, conduction through the tube is under the control of a control grid which functions in known manner and which element, as explained, is not shown or described herein.

Suitable excitation for the ignitors of valves 10 and 11 is supplied by the circuit means generally designated by the numeral 21, while the ignitors of the pairs of valves 12—13, and 14—15 are respectively energized by the circuit means generally designated by the numerals 22 and 23, respectively.

The circuit means 21–23 each could be of the type disclosed in U. S. Patent 2,362,294 granted November 7, 1944, and assigned to the assignee of this invention. As represented in the drawing, each of these circuits comprises a capacitor $C_1$ which is for the purpose of causing the firing circuit to have a leading power factor. In addition, these circuits comprise a storage capacitor $C_2$, a linear reactor LL and a non-linear reactor FL. The reactors FL are commonly known as firing reactors and the capacitors $C_2$ are known as firing capacitors. Energy stored in capacitors $C_2$ is discharged upon a predetermined degree of saturation of the firing reactors FL through the primary winding 24 of the ignitor coupling transformers ICT. Each transformer ICT is provided with a pair of secondary windings 25 and 26. The windings 25 and 26 are respectively connected across the associated ignitor element through a unidirectional conducting device 27, 28.

The holding anodes of each pair of valves such as 10 and 11 are energized by a circuit comprising a transformer 29 having a primary winding 30 and a pair of secondary windings 31 and 32. Secondary windings 31 are respectively connected through resistors 33 and unidirectional conducting devices 34 with the holding anodes 20 of valves 11, 13 and 15 while secondary windings 32 are respectively connected through resistance means 35 and unidirectional conducting devices 36 with the holding anodes 20 of valves 10, 12 and 14. The primary windings 30 of the transformers 29 are connected across the appropriate one of the conductors $1_e$, $2_e$, and $3_e$, depending upon the necessary phase relationship of the particular pair of ignitrons and its holding anode relative to the system comprising conductors 1, 2 and 3.

The auxiliary bus comprising conductors $1_e$, $2_e$, and $3_e$ is energized from the polyphase circuit comprising conductors 1, 2 and 3 through the transformer 37 having a primary winding 38 and a secondary winding 39 and through the phase shift circuit generally designated by the numeral 40.

The phase shift circuit 40 could be any suitable phase shift circuit but as illustrated this circuit is of the type disclosed and claimed in the above identified Price Patent 2,598,432. As is indicated in the drawing, the phase shift circuit 40 comprises three branch circuits each including a fixed inductive reactance 41 and a variable inductive reactance arranged in a mesh connection and having input terminals 43, 44 and 45. Each of the variable inductive reactances is provided with a main winding 46 and a control winding 47. The control windings 47 are arranged in series with each other and with a controllable resistance means 48 and a source of direct current electric energy schematically represented by the battery at 49. Thus, adjustment of the rheostat 48 controls the degree of saturation of the variable inductive reactances and in that way controls the phase angle of the voltage supplied to the input terminals 43, 44 and 45 relative to the phase angle of the output terminals 50, 51, and 52 of the circuit 40, thereby to regulate the angle of firing of the circuits 21, 22, and 23 and the instant of energization of the ignitors 19 relative to the voltage of the anodes 17 and cathodes 18 of the valves 10–15. Obviously, an adjustment of the phase shift circuit 40 automatically adjusts the phase angle of the holding anodes by adjusting the phase angle of energy supplied to the primary windings 30 of the transformers 29.

Should a fault condition occur on the circuit comprising conductors 1, 2 and 3 or within the rectifier element 7 or on the direct current circuit comprising conductors 8 and 9, an excess current will be caused to flow. Such current could be sensed by the current transformers schematically represented at 53 and in turn would supply an increased current to the winding 54 of a relay having a schematically represented armature 55 on which are mounted the contacts 56, 57, and 58. From the drawing it will be obvious that energization of the winding 54 of a predetermined magnitude would cause the armature 55 to be elevated to cause the contacts 56, 57, and 58 to engage their associated fixed contacts thereby to place a short circuit across each of the primary windings 24 of the ignitor coupling transformers ICT. When a short circuit is completed by the bridging elements 56, 57, and 58 across the windings 24 the ignitor circuits are automatically de-energized as well as the holding anode circuits and the conduction through the associated valves automatically ceases. This change in impedance of the circuit means 21, 22, and 23 due to the application of the short circuit and due to the loss of the load comprising both the auxiliary anodes 20 and their energizing circuits results in an increase in voltage at the excitation bus comprising conductors $1_e$, $2_e$, and $3_e$. Thus, as shown in Fig. 2, when the ignitors are blocked as indicated at time $t_1$, the voltage rises appreciably to a peak value indicated at time $t_2$. If the blocking circuit were immediately removed the phase angle of voltage at the time $t_2$ is such as to cause the various valves 10–15 to conduct an abnormal current.

In accordance with the invention saturable reactors 59, 60, and 61 are utilized to place an impedance across the excitation bus conductors in response to the occurrence of an abnormal condition. As is indicated in the drawing, each of the reactors 59–61 is provided with a main winding 62 and a control winding 63. Each of the main windings 62 is connected in series with an impedance 64 to form a series circuit which is connected across the circuit means comprising the firing circuits 21, 22, and 23. Thus, when the saturable reactors 59–61 are saturated by their control windings 63 the impedance thereof is substantially reduced and a current is then caused to flow through each main winding 62 and the associated impedance 64 which current tends to lower the voltage across the excitation bus to some value as indicated at time $t'_2$, as indicated in Fig. 2. This value of voltage is maintained until time $t_3$ as indicated in Fig. 2 when the ignitors are again turned on and the voltage immediately drops and then returns to a normal 100% value.

Since the voltage of the excitation bus tends to rise when the ignitor firing circuits are blocked and since the voltage supplied by the transformer winding 39 to the input terminals of the phase shift circuit 40 remains substantially constant, it is possible to use the variation from the normal relationship of these voltages to control the flow of saturating current to the control windings 63. To this end transformer arrangement 65 is connected to be energized from the polyphase circuit comprising conductors 1, 2, and 3, i. e. the input terminals of the phase shift circuit, and the output therefrom is fed to a rectifier circuit 66 which establishes a bias across the bias resistor 67, the upper terminal of which is at negative potential. In a similar fashion a voltage which varies in accordance with variations in the excitation bus voltage, i. e. the output terminals of the phase shift circuit, is derived by means of the transformer elements 68 and the rectifier circuit 69 to supply a bias to the adjustable resistor 70. Arranged in series with the conductor 71, which connects to the positive end of the bias resistor 67, the control windings 63, and the adjustable resistor 70 is a unidirectional conducting device 72 and a resistance 73. Thus, with the unidirectional conducting device 72 arranged as indicated in Fig. 1, an increase in the voltage of conductors 1, 2 and 3 relative to the voltage of the excitation bus cannot cause an increased current to flow through the control windings 63 of the saturable reactors 59, 60, and 61 due to the unidirectional action of the device 72. On the other hand if the voltage of the excitation bus exceeds its normal value relative to the voltage of the conductors 1, 2, and 3, an increased current is caused to flow through the control windings 63 thereby to cause a reduction in the reactance of the saturable reactors 59, 60, and 61. As a result an increased current is caused to flow through the various impedance means 64 and the voltage of the excitation bus is thereby reduced to some value as is indicated in Fig. 2 between the time $t'_2$ and the time $t_3$.

It will be understood that the blocking of the ignitors by the action of the bridging conductors 56, 57, and 58 could be accomplished by manual means, if desired, and the automatically operable saturable reactance means 59, 60, and 61 would immediately function to reduce the voltage across the excitation bus so that substantially normal conditions would prevail when the blocking circuit is subsequently removed. Thus substantially stable conditions would be maintained since the phase angle and voltage supplied to the ignitors would remain substantially unchanged.

While I have described a particular embodiment of the invention, I do not wish to be limited thereto and intend in the appended claims to cover all such changes and modifications as fall within the true spirit and scope of the invention.

What I claim as new and desire to secure by Letters Patent of the United States is:

1. In combination, an electronic device of the ionizable medium type having an anode, a cathode, and an ignitor, circuit means for energizing said ignitor, a phase shift circuit having input terminals and output terminals and arranged to energize said circuit means, a saturable reactor having a main winding and a control winding, said main winding being energized from the output terminals of said phase shift circuit, means for deenergizing said ignitor, and means responsive to a condition which is due to de-energization of said ignitor for causing a current to flow through said control winding which tends to cause saturation of said saturable reactor.

2. In combination, an electronic device of the ionizable medium type having an anode, a cathode, and an ignitor, circuit means for energizing said ignitor, a phase shift circuit having input terminals and output terminals for energizing said circuit means, impedance means, a saturable reactor having a main winding and a control winding, said main winding forming a part of a series circuit with said impedance means, said series circuit being connected across said circuit means, means for de-energizing said ignitor, and means responsive to a condition of said phase shift circuit which is due to de-energization of said ignitor for causing a current to flow through said control winding which tends to cause saturation of said saturable reactor.

3. In combination, an electronic device of the ionizable medium type having an anode, a cathode, and an ignitor, circuit means for energizing said ignitor, a phase shift circuit having input terminals and output terminals and being connected to energize said circuit means, a saturable reactor having a main winding and a control winding, said main winding being connected across the output terminals of said phase shift circuit, first means for deriving a direct current voltage which varies in accordance with variations in the voltage across said output terminals, second means for deriving a direct current voltage which varies in accordance with variations in the voltage across said input terminals, means for comparing the two derived voltages and for applying the resultant voltage to said control winding when the voltage across said output terminals bears a higher ratio than normal to the voltage across said input terminals, the resultant voltage so applied to said control winding being effective to cause a reduction in the impedance of said saturable reactor and in the voltage across said output terminals.

4. In combination, an electronic device of the ionizable medium type having an anode, a cathode, and an ignitor, circuit means for energizing said ignitor, a phase shift circuit having input terminals and output terminals, said output terminals being connected with said circuit means, impedance means, a saturable reactor having a main winding and a control winding, said main winding forming a part of a series circuit with said impedance means, said series circuit being connected across said circuit means, first means for deriving a direct current voltage which varies in accordance with variations in the voltage across said output terminals, second means for deriving a direct current voltage which varies in accordance with variations in the voltage across said input terminals, a unidirectional conducting device connected in series with said control winding and arranged with respect to said first and second means so as to cause a current to flow through said control winding which tends to saturate said saturable reactor when the voltage across said output terminals of said phase shift circuit exceeds its normal value relative to the voltage across said input terminals.

CARL C. HERSKIND.

No references cited.